US006594677B2

(12) United States Patent
Davis et al.

(10) Patent No.: US 6,594,677 B2
(45) Date of Patent: Jul. 15, 2003

(54) VIRTUAL TAPE STORAGE SYSTEM AND METHOD

(75) Inventors: Ray Charles Davis, Spring, TX (US); Bobby Ernest Blythe, Pearland, TX (US)

(73) Assignee: SimDesk Technologies, Inc., Houston, TX (US)

( * ) Notice: Subject to any disclaimer, the term of this patent is extended or adjusted under 35 U.S.C. 154(b) by 237 days.

(21) Appl. No.: 09/747,457

(22) Filed: Dec. 22, 2000

(65) Prior Publication Data

US 2002/0083085 A1 Jun. 27, 2002

(51) Int. Cl.[7] .............................................. G06F 17/30
(52) U.S. Cl. ...................................................... 707/204
(58) Field of Search ................................. 707/102, 204, 707/104.1

(56) References Cited

U.S. PATENT DOCUMENTS

| | | | | |
|---|---|---|---|---|
| 5,485,608 A | * | 1/1996 | Lomet et al. ................ 707/202 |
| 5,506,661 A | * | 4/1996 | Hanzawa ........................ 399/1 |
| 5,694,546 A | * | 12/1997 | Reisman ....................... 705/26 |
| 5,758,067 A | | 5/1998 | Makinen et al. ........ 395/185.07 |
| 5,765,173 A | * | 6/1998 | Cane et al. .................. 707/204 |
| 5,771,354 A | | 6/1998 | Crawford ................ 395/200.59 |
| 5,805,864 A | | 9/1998 | Carlson et al. ............. 395/500 |
| 5,901,228 A | | 5/1999 | Crawford ..................... 380/25 |
| 5,966,730 A | * | 10/1999 | Zulch .......................... 711/162 |
| 6,049,874 A | | 4/2000 | McClain et al. ............. 713/176 |
| 6,065,062 A | * | 5/2000 | Periasamy et al. .......... 709/242 |
| 6,070,224 A | | 5/2000 | LeCrone et al. ............ 711/112 |
| 6,094,605 A | | 7/2000 | Blendermann et al. ...... 700/214 |
| 6,125,388 A | * | 9/2000 | Reisman ..................... 709/218 |
| 6,199,071 B1 | * | 3/2001 | Nielsen ....................... 707/204 |
| 6,427,149 B1 | * | 7/2002 | Rodriguez et al. ............ 707/10 |
| 6,510,432 B1 | * | 1/2003 | Doyle ........................... 707/10 |

OTHER PUBLICATIONS

Internet printout, "BackOnline," http://freeback.com, Printed Dec. 14, 2000, 5 pages.
Internet printout, "Find Out More," http://www.storage-point.com, Printed Dec. 14, 2000, 3 pages.
Internet printout, INRANGE—Products "Resource Center," http://www.inrange.com, Printed Dec. 14, 2000, one page.

* cited by examiner

Primary Examiner—Safet Metjahic
Assistant Examiner—Sana Al-hashemi
(74) Attorney, Agent, or Firm—Woodard, Emhardt, Moriarty, McNett & Henry LLP (57) ABSTRACT

An archiving system allows a user to select files to be archived using a terminal connectable to a remote computer via a long distance telecommunication connection. The files may be selected from any memory accessible to the terminal including locally accessible memory and remotely accessible memory. The files are archived to a user space within a writable stable memory connected to the remote computer and may be restored to their original memory location in response to user commands from the terminal.

30 Claims, 4 Drawing Sheets

VIRTUAL TAPE STORAGE SYSTEM AND METHOD

BACKGROUND OF THE INVENTION

The present invention relates generally to a system and method for archiving files. The invention relates more specifically to such a system and method wherein a user uses a local terminal to select files which are to be archived at a remote location connectable to the local terminal through a long distance telecommunications connection.

Various systems for allowing a user to archive computer files are known. So called "near" storage uses a storage media directly connected to a local system, such as a second local hard disk, onboard memory, or other permanently attached device. The amount of data storage is directly related to the total capacity of the device that is attached. Thus, a user may not have enough physical storage space available to accommodate his needs. Further, there is a significant level of knowledge required to attach such a device, format it, and prepare it for general use. Further, the cost and maintenance of the storage device itself can be high.

Some so-called "far" (or "remote") storage systems allow a user to back up files across a network to a physical medium for off-line storage. In such a system, access to the archived data is a relatively slow process. Further, multiple users cannot simultaneously access the data.

Accordingly, there is a need for a system that allows a user to archive large amounts of data to a secure remote location, particularly such a system that allows relatively fast access to the archived data and that allows multiple users to access the same archived data. There is also a need for such a system with a relatively easy-to-use user interface. The present invention provides such a system.

SUMMARY OF THE INVENTION

The present invention provides a system and method for archiving files to a location remote from a terminal used to select the files to be archived. The remote location at least includes a writable stable memory and a computer. The user terminal at least has access to a memory from which the files to be archived may be selected. The terminal and computer are connectable over a long distance telecommunication connection such as an Internet connection. It is noted that such features may or may not be included in a particular embodiment of the inventions as summarized herein, such invention being set forth by the claims.

An object of the invention is to provide an improved method and system for archiving files.

DETAILED DESCRIPTION OF THE PREFERRED EMBODIMENTS

For the purposes of promoting an understanding of the principles of the invention, reference will now be made to the forms illustrated in the drawings and specific language will be used to describe the same. It will nevertheless be understood that no limitation of the scope of the invention is thereby intended, and alterations and modifications in the illustrated systems and methods, and further applications of the principles of the invention as illustrated therein are herein contemplated as would normally occur to one skilled in the art to which the invention relates.

Figure 1:
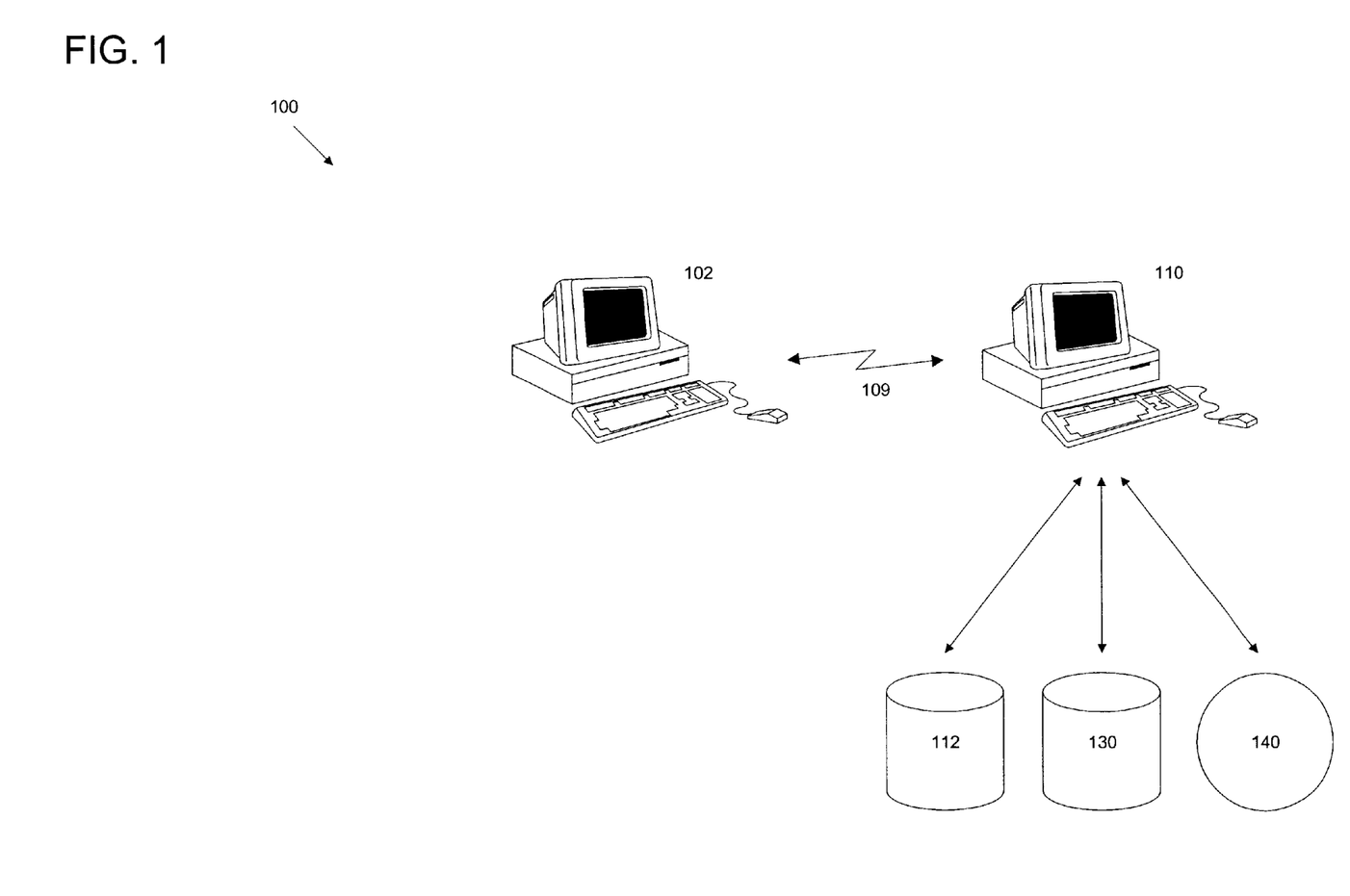
FIG. 1 is a block diagram of one form of the present invention.

Referring now to FIG. 1 a block diagram of a virtual tape storage system 100 according to the present invention is shown. A user terminal 102 allows a user to select files be stably archived. Terminal 102 connects via a long distance telecommunications line connection 109 to remote computer 110. Computer 110 is connected to memory 112 for stable archiving of files. Computer 110 is optionally connected to memory 130 for storing files to be stably archived. Computer 110 is also optionally connected to archival memory 140 for copying files which have been stably archived on memory 112.

Terminal 102 can be any type of computer processing device capable of connecting to a telecommunications line, including but not limited to personal computers, diskless workstations, web-enabled appliances, smart-TV consoles, PDAs (personal data assistants) or the like. Connection 109 may be any form of long distance telecommunication line. "Long distance telecommunications line" or "telecommunications line" refers to a non-local communication connection including, but not limited to, a modem or other dialup connection, an Internet connection, or a wireless connection suitable for communicating with a PDA such as the Omni Sky service. "Line" refers to such a connection in any form, whether or not there is a direct physical connection. Thus a "telecommunications line" could include intervening switching devices, satellite links, wired or wireless relays and/or repeaters, and the like.

In operation, system 100 allows a user to select files to be stably archived into memory 112. Files are selected by a user at user terminal 102. The files may be selected from any memory that terminal 102 has access to. For example depending on the form of terminal 102 chosen, files may be selected from: a local memory such as a hard drive; a local area networked memory such as a hard drive accessible through a local area network; or a memory such as memory 130 accessible through computer 110 via connection 109. The user also selects one or more times when files are to be archived. Alternately, an event interval—rather than a time-based interval—may be used, corresponding for example to an event such as a file being modified or accessed.

Further describing the operation of system 100, when a preselected time (or event) interval has occurred (such as hourly, daily, weekly, monthly, yearly, or otherwise), terminal 102 begins the process of stably archiving files the user has previously selected for archiving. Alternately, the user may start the archiving process manually at any time. Terminal 102 sends the list of files to remote computer 110 via connection 109. For each file, computer 110 then receives data corresponding to the file's contents. If the file is accessible by computer 110 via terminal 102 (e.g. a file located in a memory locally connected to terminal 102), computer 110 instructs terminal 102 to access the file and transmit its contents across connection 109. If the file is directly accessible by computer 110 (e.g. a file located in memory 130), computer 110 reads the contents of the file. After receiving data for a file, computer 110 creates a file in writable stable memory 112. Computer 110 repeats the steps above until all files have been stably archived. Files stably archived in memory 112 may optionally be backed up onto a separate archival memory 140 for off-line storage.

After files are archived, a user may then restore any or all of the archived files. When the user desires to perform a restore operation, terminal 102 sends a request to computer 110 for a list of archived files. Terminal 102 then provides the user with a listing of the archived files. The user selects which files are to be restored. Terminal 102 sends a request for each file to be restored to computer 110. Computer 110 then retrieves the contents—from writable stable memory 112—of each file to be restored. Computer 110 then restores the files to their original location; e.g. the memory location from which they were originally read for archiving. In the case of memory directly accessible by computer 110 (e.g. memory 130) the files are restored directly. In the case of memories accessible via connection 109 (e.g. a hard drive connected to terminal 102) the file contents are transmitted to terminal 102 from which the files are restored.

"Original location" as used this application refers to a location associated with a particular memory as referenced by whatever computer system accesses that memory. Under many computer systems, a computer memory is referenced by a single alphanumeric character designation: e.g. a "C" drive. However, this designation may change if for example other memories are added or removed from the computer system. Also the physical memory medium itself may change in the case of removable media such as removable hard disks, ZIP disks or the like. Thus it is to be noted that "original" location means as referenced by the system, and typically the application software (e.g. word processing, spreadsheet, database, or otherwise) which directly accesses the memory. Hence, "original" location refers to a logical location rather than a physical location. Although in some instances the logical and physical location will coincide.

As used in this application "memory" or "computer memory" refers to any non-paper, machine electronically readable media capable of storing computer data, including but not limited to: a hard disks, arrays of hard disks, ZIP disks, floppy disks, compact discs, and the like. "Archival memory" refers to any memory having a medium designed to be physically removed from a computer system, or any media in a system not intended for on-line user access including but not limited to computer tapes, compact disks, hard disks and the like. Thus for example, hard disk memory in a computer, or network of computers are "archival" if a user does not access the files directly, but rather has access to the files after they are copied to another memory such as memory 112. "Stable archiving" refers to storing data on a non-volatile computer memory; a "non-volatile" computer memory refers to a computer memory that does not require external power in order to preserve any data contained therein. A "stable memory" or "writable stable memory" refers to a non-volatile computer memory into which data can be written at least one time.

Figure 2:
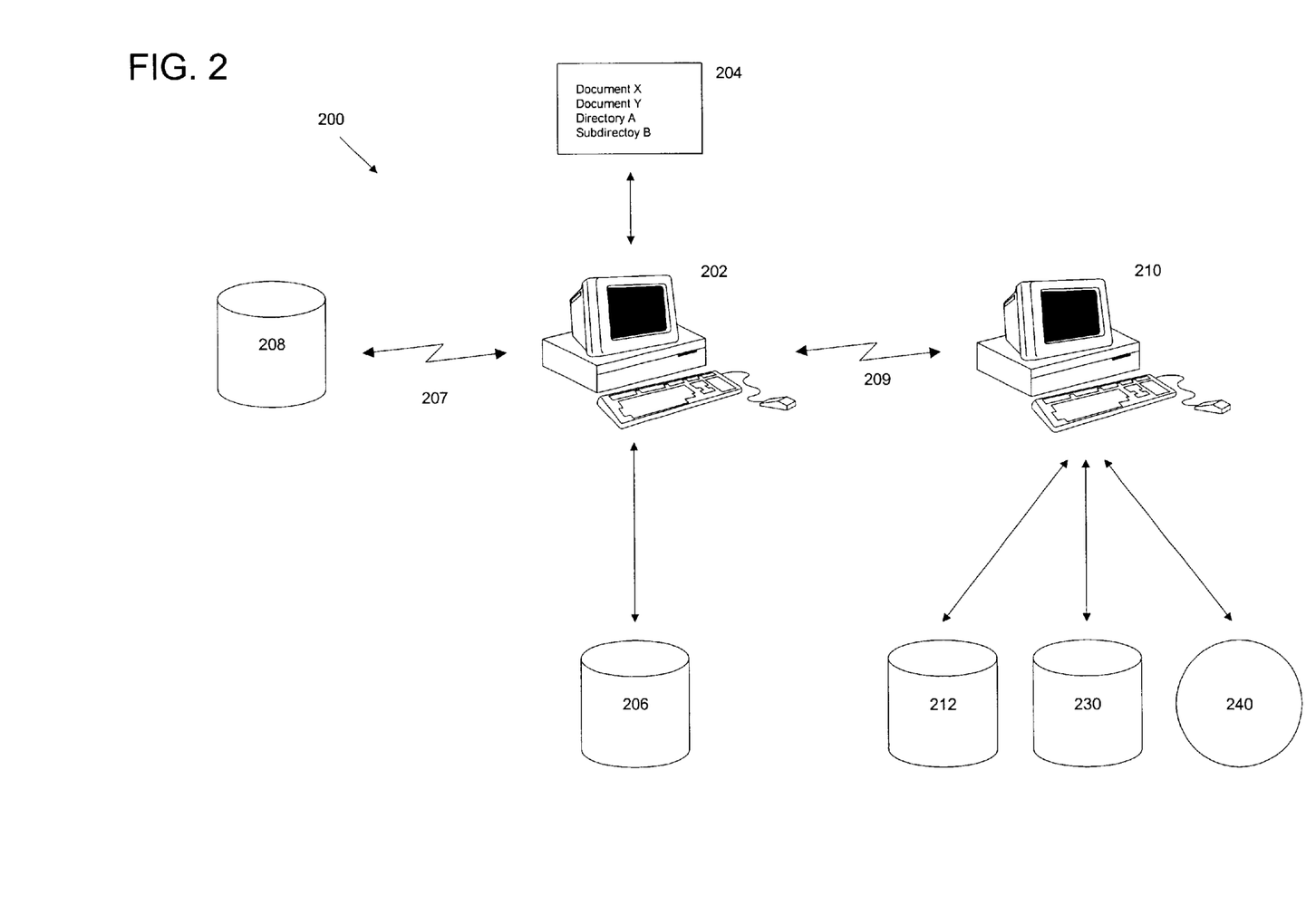
FIG. 2 is a block diagram of one form of the present invention.

Referring now to FIG. 2 a block diagram of a virtual tape storage system 200 according to the present invention is shown. System 200 is similar to system 100 of FIG. 1 but may include various optional features. A user terminal 202 allows a user to create a backup set specification 204 which includes a list of files to be stably archived. Terminal 202 is optionally connected to memory 206 for storing files to be stably archived. Terminal 202 is also optionally connected via optional network connection 207 to memory 208 for storing files to be stably archived. Terminal 202 connects via telecommunications connection 209 to remote computer 210 which typically has normal RAM or other memory to operate as a server. Computer 210 is connected to memory 212 for stable archiving of files. Computer 210 is optionally connected to memory 230 for storing files to be stably archived. Computer 210 is also optionally connected to archival memory 240 for copying files which have been stably archived on memory 212.

Terminal 202 may be a diskless workstation, personal computer, web-appliance, smart-TV console, PDA, or the like. Memories 206, 208, and 230 may be any form of computer memory such as, for example, a hard disk. Connection 207 may be any form of network connection such as LAN, WAN, dialup, or Internet connection. Connection 209 may be any form of long distance telecommunication connection.

In operation, system 200 allows a user to select files to be stably archived onto memory 212. The files are selected by a user at user terminal 202 and stored in backup set specification 204. The files may be selected from any memory that terminal 202 has access to, such as memories 206, 208, or 230. Preferably, a user is also allowed to select entire directories and/or subdirectories for archiving. Such directories or subdirectories are included in the term "files" in set specification 204. In one preferred form, specification 204 is created by using a computer application such as application 303 described below in connection with FIG. 3. The user also selects one or more times when the files listed in specification 204 are to be stably archived in memory 212. Any times (or "intervals") selected may be single events or recurring events; e.g. repeated daily, weekly, monthly, etc. Other, non time-based intervals (or "event intervals") may be used such as each time a file is accessed or modified. Collectively, the list of files and selected intervals form part of backup set specification 204. The acts of selecting files and defining intervals do not have to be done in any particular order. Preferably, the user also specifies a name for the backup set to be archived in memory 212. This aids the user in subsequent restoration of any desired files as described below. Alternately the name for the backup set could be automatically generated. Optionally, multiple set specifications may be created by the user with different and/or overlapping files, and with various interval parameters.

Further describing the operation of system 200, when a preselected interval (time-based or otherwise) as specified in backup set specification 204 has occurred, terminal 202 begins the process of automatically stably archiving files listed in specification 204. Alternately, the user may start the archiving process manually at any time. Optionally, pre-defined time intervals (e.g. as pre-selected by a system administrator) may be used instead of or in addition to user-selected intervals. Terminal 202 sends specification 204 to remote computer 210 via connection 209. Preferably the specification is transmitted in the format of an extensible markup language such as XML. For each file listed in specification 204, computer 210 then receives data corresponding to the file's contents. If the file is accessible by computer 210 via connection 209 (e.g. the file is located in memory 206 or memory 208), computer 210 instructs terminal 202 to access the file and transmit its contents across connection 209. Optionally, any file contents so transmitted via connection 209 may be in a compressed format and/or an extensible markup language format. Any such compression may be performed by terminal 202 before the file is transmitted or on the fly. Optionally, the files may have already been compressed. In a preferred form, terminal 202 compresses files before transmission in accordance with compression algorithms available under the commercially available program PKZIP. Other compression methods are contemplated nonetheless.

If the file is directly accessible by computer 210 (e.g. the file is located in memory 230), computer 210 reads the contents of the file. Any file read by or transmitted to computer 210 may optionally be checked for transmission errors by a known method, such as a check-sum, CRC, or the like. If transmission errors are so detected, computer 210 may return an error code to terminal 202, for example, instructing it to retransmit the file. Transmitted files may also be optionally checked for viruses.

In a preferred form, data is read from files one at a time. However, near-simultaneous reading from multiple files is also contemplated. After receiving data for a file, computer 210 creates a file in writable stable memory 212. In a preferred form, files are written into a predefined user space within stable memory 212. As described below in connection with FIG. 3, a method for predefining user space is illustrated, useful in the present form. Preferably, the original filename and directory structure are preserved thus allowing the file to be restored back to its original location. Computer 210 repeats the steps above until all files listed in specification 204 have been stably archived. Optionally, any errors detected during the archiving process (such as a file creation error) are indicated to terminal 202 as an error code transmitted across connection 209. Collectively, the files so archived are referred to herein as a "backup set".

Preferably, as files are created in memory 212, computer 210 updates an index file (not shown) corresponding to the file name and location in memory 212. Preferably, the contents of the index file (if any) are stored as an extensible markup language format, such as XML. Other services may be optionally provided on the archived files or a copy by computer 110 of the files such as virus scanning or otherwise, the results of which may be reported to the user of terminal 202.

After files are archived, a user may then restore any or all of the archived files. When the user desires to perform a restore operation, terminal 202 sends an electronic request to 210 for a list of all backup sets previously created for that user and a list of any files, directories, and/or subdirectories contained in those backup sets. Optionally other users in a predefined group may also access the user's backup sets. Also optionally, the backup sets could be accessible by any user with access to computer 210. Computer 210 sends a list of backup sets and files therein when so requested. If an index was used in creating any backup sets, that index file may be transmitted to terminal 202. Otherwise, terminal 210 can recreate such a list on the fly or transmit file and directory listings directly across connection 209. However, a preferred form uses an index file created (or updated if one already exists) during the archiving process; transmitting a pre-existing index file minimizes computation time and bandwidth, especially in the case of large directory structures and file lists.

Terminal 202 then provides the user with a listing of accessible backup sets and files therein. Preferably this information is presented in a tree-view structure such as provided by the sample screenshot listing shown in FIG. 4 and described in connection therewith. Other forms of presenting this information are contemplated, however; such as a network structure using nodes. The user then selects which files are to be restored. Terminal 202 sends a request for each file to be restored to computer 210. Such requests may be sent individually for each file to be restored or grouped in a batch listing. Computer 210 then retrieves the contents—from writable stable memory 212—of each file to be restored. Files may be so retrieved either one at a time or multiple files may be retrieved near-simultaneously. Computer 210 then restores the files to the memory location from which they were originally read for archiving. In the case of memory directly accessible by computer 210 (e.g. memory 212) the files are restored directly. In the case of memories accessible via connection 209 (e.g. memories 206 and/or 208) the file contents are transmitted to terminal 202 from which the files are restored. If the files were optionally compressed during archiving, the files may be decompressed prior to being restored.

Still referring to FIG. 2, files stably archived in memory 212 may optionally be backed up onto archival memory 240 for off-line storage. Such backup to memory 240 may be performed automatically (e.g. at predefined intervals), may be requested by a user at terminal 202, or may be performed by an operator with access to computer 210. When files are restored as described above, if any errors are detected, or if a file to be restored is no longer in memory 212, the file may be accessed from memory 240 instead. Additionally, if stably archived files have been so backed up onto memory 240, those files may optionally be copied onto a removable media (such as a computer tape or compact disk) which optionally may be physically sent to the user (e.g. via mail) when so requested or at periodic intervals.

Figures 3, 3A:
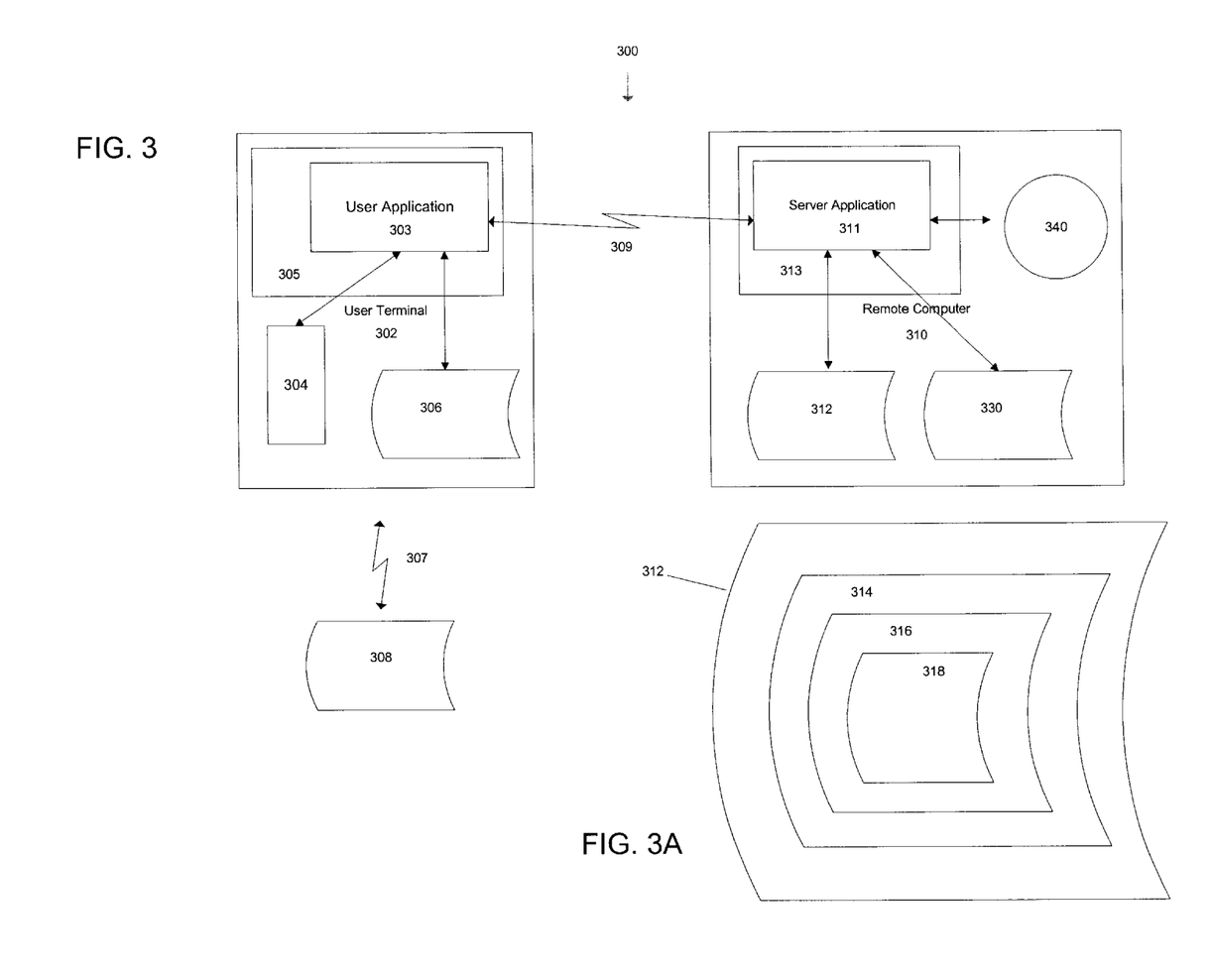
FIG. 3 is a block diagram of one form of the present invention.
FIG. 3A is a more detailed view of a memory illustrated in FIG. 3.

Referring now to FIG. 3, a block diagram of a virtual tape storage system 300 according to the present invention is shown. System 300 is similar to systems 100 and 200 of FIGS. 1 & 2, respectively, but may include various optional features. A user terminal 302 comprises a user application 303 operable to run within memory 305. Terminal 302 optionally includes a memory 306 for storing files. Backup set specification 304 is created by user and includes a list of files (including directories, subdirectories, etc.) to be archived. The computer optionally may be connected to a computer memory 308 via network connection 307. Terminal 302 is connected to remote computer 310 via long distance telecommunication connection 309.

Still referring to FIG. 3, remote computer 310 comprises a server application 311 operable to run within memory 313. Computer 310 also includes a writable stable memory 312 detailed in FIG. 3A. User space 314 is a subset of storage space in memory 312. Backup space 316 is a subset of storage space in user space 314. Backup set space 318 is a subset of storage space in backup space 316. As will be described in more detail, files which are listed in specification 304 are stably archived in backup set space 318 via the present inventive system and method. Computer 310 optionally includes memory 330 for storing files. Computer 310 also optionally includes archival memory 340, which can be used to archive data contained in memory 312 for off-line storage, typically of the same data.

Terminal 302 may be any type of processing device—capable of connecting to a long distance telecommunications line—such as a diskless workstation, personal computer, web-appliance, smart-TV console, PDA or the like. Memories 306, 308, and/or 330 if chosen, may be any form of computer memory such as hard disks. Connection 307 may be any form of network connection such as LAN, WAN, dialup, or Internet connection. Connection 309 may be any form of long distance telecommunications connection. Files stably archived in memory 312 may optionally be backed up onto archival memory 340 for off-line storage.

User application 303 is a computer program capable of running within memory 305 of terminal 302. Among other functions, application 303 allows a user to: select computer files to be stably archived; specify a time interval and/or event interval when computer files are to be stably archived; and restore files which have previously been stably archived. Files to be so archived may be selected from any computer memory that application 303 is capable of accessing; including memories 306, 308, and/or 330 if so chosen. In a preferred form, user application 303 has access to local memory, such as memory 306, although in some forms, terminal does not contain a memory 306 for storing computer files. For example, terminal 302 may be selected as a diskless workstation, in which case the user would select files to be stably archived from one or more computer memories accessible to the diskless workstation across a connection such as network connection 307 or telecommunications connection 309. In another form, terminal 302 may be selected as a smart-TV device having a telecommunications connection 309 for communicating with server 310, but not having a local memory 306 or a network connection 307. In this form, the user may select files to be stably archived from a memory that computer 310 has access to, such as memory 330. Files stably archived in memory may optionally be backed up onto archival memory 340 for off-line storage.

An example operation of the present invention will now be described. Prior to archiving files, a user first specifies—via user application 303—information required to create a backup space 316 within user space 314. In a preferred form the user specifies a size and name for backup space 316. Preferably, the size is selected from a list of discrete computer memory sizes (e.g. 2 gigabytes, 4 gigabytes, etc.). Alternately the user could be allowed to specify any size for backup space 316. If a system according to the present invention is used as part of a commercial service (e.g. a service providing users with stable archiving of files onto a remote server accessible through the Internet), fees can optionally be charged according to the size of a backup space selected. For example, an initial creation fee of $30 could be charged for creating any size of backup space. Additionally a recurring storage fee could be charged. For example a fee of $8 per month could be charged for a 4 gigabyte backup space; a lesser amount could be charged for a 2 gigabyte space. Further, such a commercial service could provide users with access to an internet-accessible memory (such as memory 330) from which files to be archived may be selected. Further, such a commercial service might only allow subscription users to access archiving services. For example a commercial service could provide limited functionality to "free" customers, such as access to 25 megabytes of storage space (e.g. on a memory such as memory 330) but no access to archiving services. Whereas subscription customers (being charged, for example, a $10 per month subscription fee), could for example be given 100 megabytes of storage space and be given access to archiving services. Alternate business models for generating revenue by a commercial service using a system according to the present invention are possible.

Still referring to an operation of the present invention, in addition to specifying a size for a backup space, a user may also specify a name for a backup space 316. Alternately the name for backup space 316 may be automatically generated; e.g. as a function of a time/date stamp. In a preferred form the backup space name must be unique within user space 314. Optionally the user may specify other parameters for backup space 316 such as a group designation indicating other users who will have permission to access the backup space. Optionally, a timestamp may be included in (e.g. appended to) a user-specified name. Collectively, the information defining a backup space is herein referred to as the backup space specification. User application 303 sends the backup space specification to server application 311, which creates the backup space as described below.

The specification is received by application 311 which then creates data structures within user space 314 for backup space 316. If the user does not already have a user space 314 allocated to him or her (e.g. the user has not previously created a backup space), application 311 first creates user space 314 in memory 312. Preferably, application 311 returns a code to application 302 indicative of the success or failure of creating a backup space and/or user space.

Once a backup space 314 has been created for the user, the user may then create backup set definition 304—via application 303—specifying files to be stably archived. Preferably, the user is presented with a list of files in a tree view format displaying the names and directory structures of files which application 303 has access to. Other forms of presenting this information to the user are contemplated; for instance a network structure using nodes can be employed rather than a tree view structure. The user may define a set definition by other parameters such as the date of file creation, a project or group number associated with the file, the author of the file, or otherwise. The user selects one or more files which are to be stably archived. Preferably, the user also selects one or more times at which an archiving is to be performed. Preferably the user also has the option to select a recurring time interval (e.g. daily, weekly, monthly, etc.) or event interval. Also preferably the user can select a name for the backup set which is to be archived in backup set space 316. Alternately the name for the backup set may be automatically generated.

If a backup set space 316 already exists for the user, the user may choose to either overwrite the existing backup set therein, or to append to the backup space in which case a new backup set therein will be created. Optionally, the user may be allowed to choose to span backup set spaces if more than one exists. For example, if the user has selected files which will occupy more space than is available in one backup space, some files can be archived to one backup space, while other files can be archived to a different backup space. If such spanning of backup spaces is allowed, preferably the user is alerted to the possibility that selected files may not fit within one backup space and is then given a choice to span onto another backup space or create additional backup spaces. Alternately, spanning could be done automatically if the user has any other backup spaces available.

It is to be noted that no particular order is required with respect to the acts of selecting files, specifying a time interval, or naming the backup set. For example a user may select a time interval first, then select files, or vice versa. Further, multiple acts of selecting files and/or specifying times are contemplated. For example a user may select files, then select a time interval, then select additional files and/or delete already-selected files from the list, then add additional time intervals and/or delete already-specified time intervals.

After backup set definition 304 is created, application 303 periodically determines whether any time intervals specified in definition 304 have occurred; if so it begins the archiving process. Optionally, a user may begin the archiving process manually via application 303. Application 303 sends specification 304 to remote computer 310 via connection 309. Preferably, but not necessarily, the specification is transmitted in the format of an extensible markup language such as XML.

For each file listed in specification 304, application 311 then receives data corresponding to the file's contents. If the file is accessible by application 311 via connection 309 (e.g. the file is located in memory 306 or memory 308), application 311 instructs application 303 to access the file and transmit its contents across connection 309. Optionally, any file contents so transmitted via connection 309 may be in a compressed format and/or an extensible mark-up language format. Any such compression may be performed by application 303 before the file is transmitted or on the fly. Optionally, the files may have already been compressed. In a preferred form, application 303 compresses files before transmission in accordance with compression algorithms available under the commercially available program PKZIP. Other compression methods are contemplated nonetheless.

If the file is directly accessible by computer 311 (e.g. the file is located in memory 330), application 311 reads the contents of the file. Any file read by or transmitted to application 311 may optionally be checked for transmission errors by a known method, such as a check-sum, CRC, or the like. If transmission errors are so detected, application 311 may return an error code to application 302, for example, instructing it to retransmit the file. In a preferred form, data is read from files one at a time. However, near-simultaneous reading from multiple files is also contemplated.

After receiving data for a file, application 311 creates a file in backup set space 318 of writable stable memory 312. Preferably, the original filename and directory structure are preserved thus allowing the file to be restored back to its original location. Application 311 repeats the steps above until all files listed in specification 304 have been stably archived into backup set space 318. Preferably, application 311 prevents any further altering of any files in backup set space 318 unless the user subsequently chooses to overwrite a backup set with a new backup set. Optionally, any errors detected during the archiving process (such as a file creation error) are indicated to application 303 as an error code transmitted across connection 309.

Preferably, as files are created in memory backup set space 318, application 311 updates an index file (not shown) corresponding to the file name and location in the backup set space. Preferably, the contents of the index file (if any) are stored as an extensible markup language format, such as XML.

After files are archived, a user may then restore any or all of the archived files. When the user desires to perform a restore operation, application 303 sends a request to application 311 for a list of all backup sets previously created for that user and a list of any files contained in those backup sets. Optionally other users in a predefined group may also access the user's backup sets. Also optionally, the backup sets could be accessible by any user with access to computer 310. Application 311 sends a list of backup sets and files therein when so requested. If an index was used in creating any backup sets, that index file may be transmitted to application 303. Otherwise, application 311 can recreate such a list on the fly or transmit file and directory listings directly across connection 309. However, a preferred form uses an index file created (or updated if one already exists) during the archiving process; transmitting a preexisting index file minimizes computation time and bandwidth, especially in the case of large directory structures and file lists.

Application 303 then provides the user with a listing of accessible backup sets and files therein. Preferably this information is presented in a tree-view structure such as provided by the example listing shown in FIG. 4. Other forms of presenting this information are contemplated, however; such as previously described. The user selects which files are to be restored. Application 303 sends to application 311 a request for each file to be restored. Such requests may be sent individually for each file to be restored or in a group listing. Application 311 then retrieves the contents—from backup set space 318—of each file to be restored. Files may be so retrieved either one at a time or multiple files may be retrieved near-simultaneously. Application 311 then restores the files to the memory location from which they were originally read for archiving. In the case of memory directly accessible by application 311 (e.g. memory 312) the files are restored directly. In the case of memories accessible via connection 309 (e.g. memories 306 and/or 308) the file contents are transmitted to application 303 from which the files are restored. If the files were optionally compressed during archiving, the files may be decompressed prior to being restored.

Figure 4:
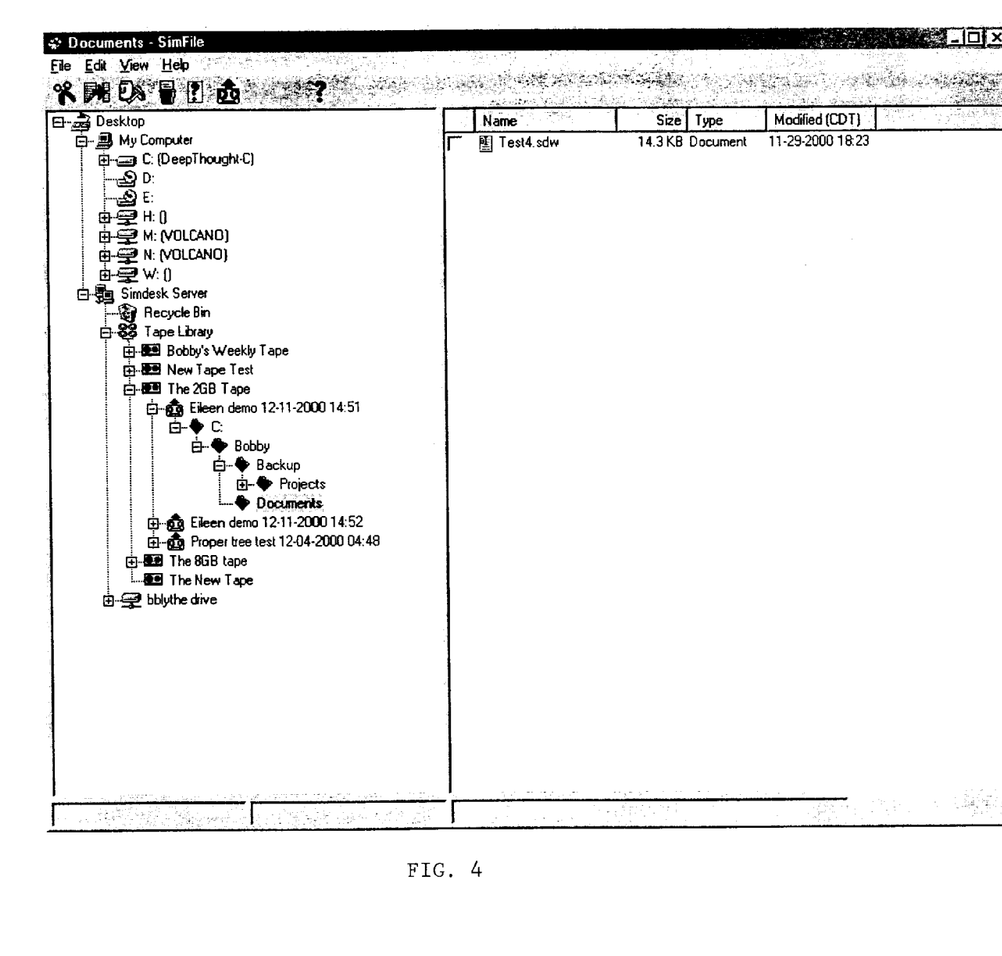
FIG. 4 is an example of an interface of a computer application useful with the present invention.

Referring now to FIG. 4, a sample user interface 400 useful with various forms of the present invention is shown. Interface 400 runs on a user terminal (e.g. terminal 102, 202, and/or 302 of FIGS. 1, 2, and 3 respectively) and presents a user with a list of files to be archived and a list of files (if any) which have been previously archived. The interface presents file and directory listing in a tree view format, although other formats for presenting such information is contemplated.

Referring to FIG. 4 in more detail, on the left side of interface 400 is shown a tree view listing. At the top level of the tree view listing is an icon labeled "Desktop". Hereinafter any descriptions with reference to FIG. 4 contained within quotes are to be understood as referring to particular icons as displayed on interface 400. Two sublevels of "Desktop" are shown: "My computer", the sub levels of which are files that a user may access directly through a user terminal; and "Simdesk server", the sub levels of which represent existing user spaces on a stable writable memory (e.g. memories 112, 212, and 312 of FIGS. 1, 2, and 3, respectively).

"Tape library" represents a user space, such as user space 314 of FIG. 3A. Sub levels of "tape library" represent a backup space such as backup space 316 of FIG. 3A. "The 2GB Tape" is one such backup space. Sub levels thereof (three are shown) represent individual backup set spaces such as back up set space 318 of FIG. 3A. Two such backup set spaces are named "Eileen demo 12-11-2000 14:51" and "Eileen demo 12-11-2000 14:52". The backup space set names include a timestamp; note that the timestamps in the two names referred to differ by one minute; indicating that they were created at different times.

Referring particularly now to "Eileen demo 12-11-2000 14:51", sublevel "C:" is shown. "C:" contains sublevels corresponding to files archived from a memory corresponding to "C: (Deep Thought-C)" shown under "My computer". Accordingly, any files restored from "C:" will be restored onto "C: (Deep Thought-C)". An icon representing a folder is display next to "C:" indicating that it contains subdirectories or files. "Bobby" is a subdirectory of "C:" containing subdirectory "Backup" which itself contains subdirectory "Documents". "Documents" is highlighted indicating that it and any files and subdirectories therein, have been selected for restoration. Any files, directories, and subdirectories so restored would be restored into their corresponding locations within "C:(Deep thought-C"). Such restoring of files could be accomplished as described above in connection with FIGS. 1, 2, or 3.

While the invention has been illustrated and described in detail in the drawings and foregoing description, the same is to be considered as illustrative and not restrictive in character, it being understood that only the preferred forms have been shown and described and that all changes and modifications that come within the spirit of the invention are desired to be protected.

What is claimed is:

1. A system for stable archiving of computer files, the system comprising:
   at least one user terminal located at a first location for generating a list of computer files, said computer files listed in said list being within a first computer memory for storing said computer files;
   a remote computer having a second writable stable computer memory, said second computer memory being located at a second location that is remote from said first location;
   said user terminal and said remote computer being connectable via long distance telecommunications line;
   said list of files being transmitted from said user terminal via said long distance telecommunications line to said remote computer;
   at least one file listed in said list being transmitted from said first computer memory to said second computer memory for stable archiving of said at least one file for subsequent access of said at least one file by a user,
   said list being transmitted in an extensible mark-up language.

2. The system of claim 1 wherein said list of files is part of a backup set specification;
   said backup set specification further comprising at least one scheduled time interval corresponding to a time when source computer files listed in said list are to be stably archived.

3. The system of claim 2 further comprising:
   a user application operable to run on said user terminal;
   a server application operable to run on said remote computer;
   said user application and said server application being operable to communicate over said telecommunications line;
   said user application being configured to transmit said list; and
   said server application being configured to receive said list.

4. The system of claim 3 wherein said server application is configured to prevent alteration of stably archived files.

5. The system of claim 4 wherein said telecommunications line comprises an Internet connection.

6. The system of claim 5 wherein said user application includes an interface for displaying files and directories using a tree view structure; and
   said generating of said list is done using said interface.

7. The system of claim 6 wherein said user application allows specifying a size of a backup space for storing files within said second memory; and
   wherein a user fee is charged according to said size specified.

8. The system of claim 7 further comprising an archival memory for off-line storage of at least one file stored in said second memory.

9. The system of claim 8 wherein said interface is further configured to allow a user to select files to be restored from said second memory; and
   said server application being configured to restore files from said second memory.

10. The system of claim 9 wherein said server application is further configured to allow a group user in a predefined group of users to restore files associated with any user in said predefined group of users.

11. The system of claim 10 wherein said server application if further configured to transmit to said user application an index file listing files stored in said second memory;
   said index file being transmitted in an extensible mark-up language.

12. The system of claim 11 further comprising:
   a user application operable to run on said user terminal;
   a server application operable to run on said remote computer;
   said user application and said server application being operable to communicate over said telecommunications line;
   said user application being configured to transmit said list; and
   said server application being configured to receive said list.

13. The system of claim 12 wherein said server application is further
   configured to allow a group user in a predefined group of users to restore files associated with any user in said predefined group of users;
   said server application being further configured to transmit to said user
   application an index file listing files stored in said second memory;
   said index file being transmitted in an extensible mark-up language.

14. The system of claim 1 wherein said telecommunications line comprises an Internet connection.

15. The system of claim 1 further including a user application operative to run on said user terminal;
   said application including an interface for displaying files and directories using a tree view structure; and
   said generating of said list is done using said interface.

16. The system of claim 1 wherein said terminal is configured to allow a user to specify a size of a backup space within said second memory for stable archiving of files; and
   wherein a user fee is charged according to said size.

17. A method for stable archiving of computer files, the method comprising:
   defining a backup set comprising:
      a backup list comprising at least one source computer file name corresponding to a source computer file located in a first computer memory;
      at least one scheduled time interval corresponding to a time when source computer files listed in said backup list are to be stably archived;
   determining when said at least one scheduled time interval has occurred;
   transmitting said backup list across a long distance telecommunications connection to a remote computer;
   reading said at least one source computer file name from said backup list;
   locating said source computer file corresponding to said source computer file name;
   reading data from said source computer file;
   writing said data into a destination computer file in a second writable stable computer memory connected to said remote computer.

18. The method of claim 17 wherein said telecommunications line comprises an Internet connection.

19. The method of claim 17 wherein said defining of said backup set is done using a user application including an interface for displaying files and directories using a tree view structure.

20. The method of claim 17 including specifying a size of backup space within said second memory for writing said data; and charging a user a fee according to said size specified.

21. The method of claim 17 including transmitting in an extensible mark-up language to a user application an index file listing files stored in said second memory for selecting files to be restored.

22. A system for stable archiving of computer files comprising:

a user terminal having a first memory;

a user application operable to run in said first memory;

a remote computer having a second memory;

a server application operable to run on said remote computer;

a third writable stable computer memory operable to communicate with said server application, said third memory being separate from said first memory and said second memory;

a long distance telecommunication connection operable to communicate with said client application and to communicate with said server application via a telecommunications line;

said client application being further configured to transmit to said server a predefined list of source computer files, the source computer files being located in a source computer memory;

said server application being operable to receive said list;

said server application being further configured to read data corresponding to the contents of at least one source computer file listed in said list; and said server application being further configured to write said data into said destination writable stable computer memory.

23. The system of claim 22 wherein said telecommunications line comprises an Internet connection.

24. The system of claim 22 wherein said user application includes an interface for displaying files and directories using a tree view structure.

25. The system of claim 22 wherein said user application is further configured to allow a user to specify a size of backup space within said second memory for writing said data.

26. The system of claim 22 wherein said server application is configured to transmit in an extensible mark-up language to said user application an index file listing files stored in said second memory for selecting files to be restored.

27. A method for stable archiving of computer files, the method comprising:

defining at least one user space within a first writable stable computer memory connected to a remote computer;

defining at least one backup space within said user space;

defining at least one backup set definition comprising a list corresponding to at least one computer file located in a second computer memory accessible by a user terminal;

copying said at least one computer file listed in said backup set to said at least one backup space;

preventing alteration of said computer files in said at least one backup space;

said user terminal being remote from said first writable stable computer memory.

28. The method of claim 27 wherein said defining of said backup set definition is done using a user application including an interface for displaying files and directories using a tree view structure.

29. The method of claim 27 including specifying a size of said backup space within said second memory for writing said data; and charging a user a fee according to said size specified.

30. The method of claim 27 including transmitting in an extensible mark-up language to said, user terminal an index file listing files stored in said second memory for selecting files to be restored.

* * * * *